Aug. 13, 1935.  W. G. HOELSCHER  2,011,318
RELIEVING ATTACHMENT
Filed July 2, 1934  7 Sheets-Sheet 1

INVENTOR
William G. Hoelscher
BY
Wood + Wood
ATTORNEYS

Aug. 13, 1935.  W. G. HOELSCHER  2,011,318
RELIEVING ATTACHMENT
Filed July 2, 1934  7 Sheets-Sheet 3
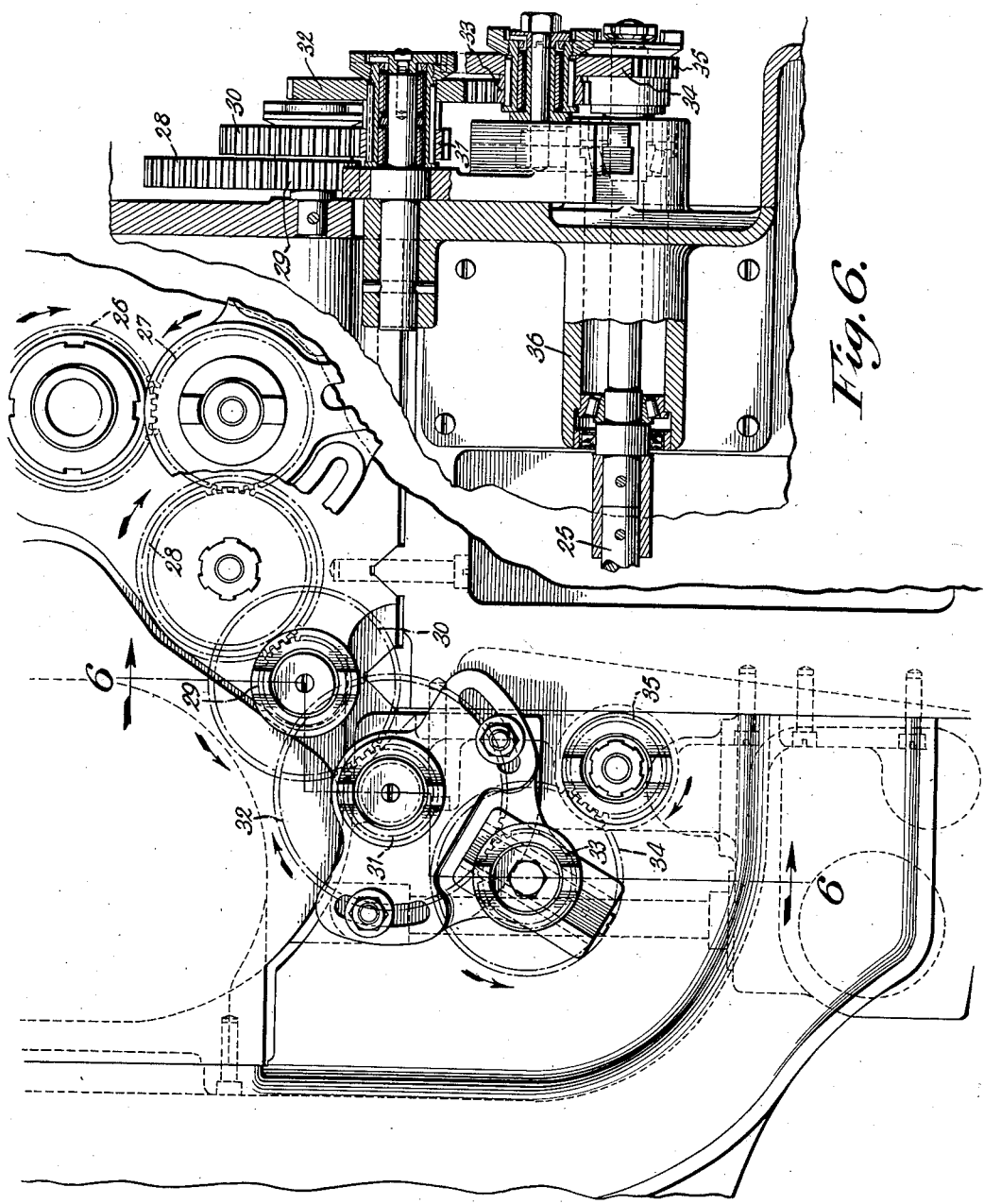
INVENTOR
William G. Hoelscher
BY
Wood + Wood ATTORNEYS

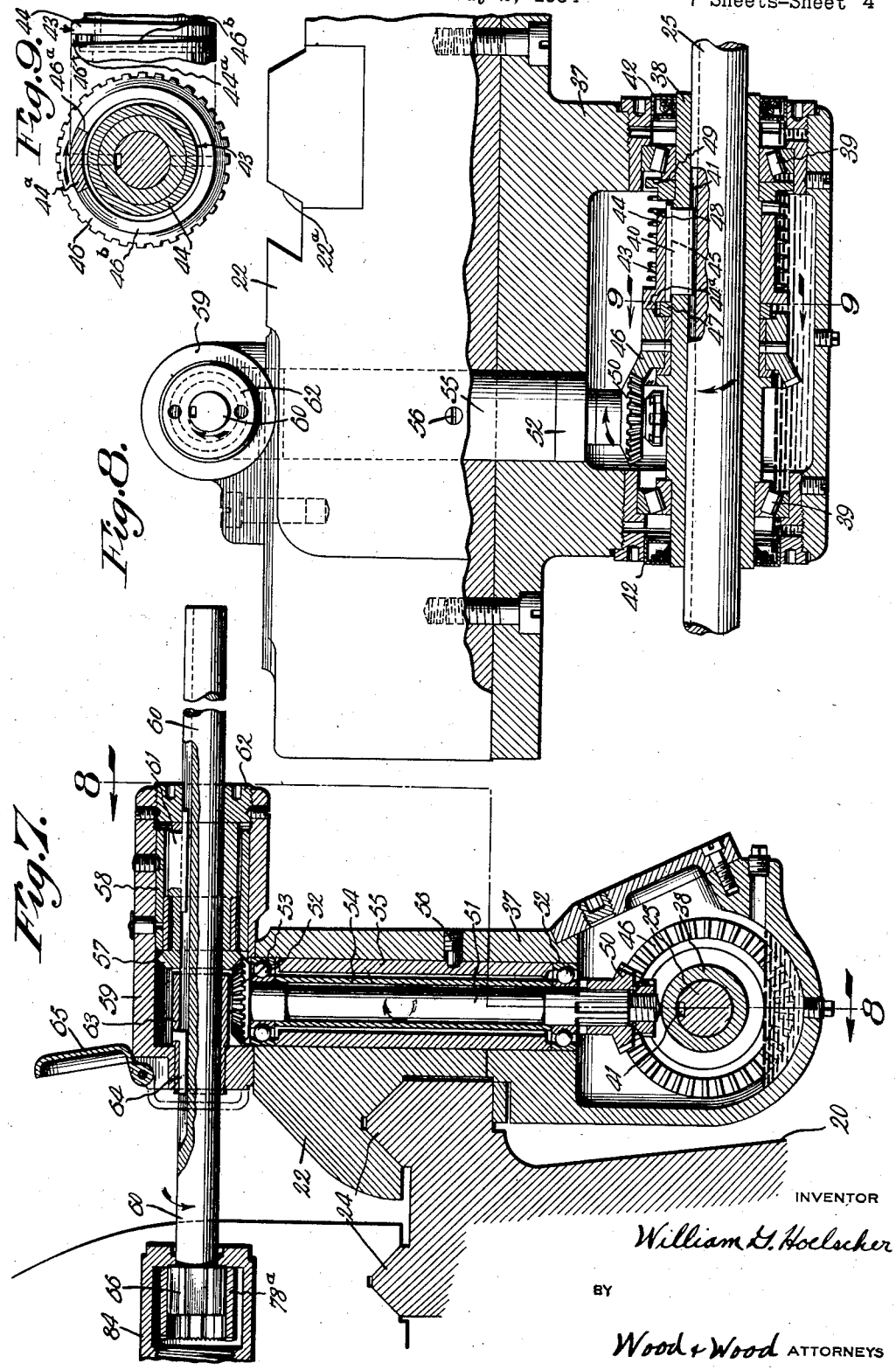

Aug. 13, 1935.   W. G. HOELSCHER   2,011,318
RELIEVING ATTACHMENT
Filed July 2, 1934   7 Sheets-Sheet 5

INVENTOR
William G. Hoelscher
BY
Wood & Wood   ATTORNEYS

Aug. 13, 1935.                    W. G. HOELSCHER                    2,011,318
                                  RELIEVING ATTACHMENT
                                  Filed July 2, 1934            7 Sheets-Sheet 6
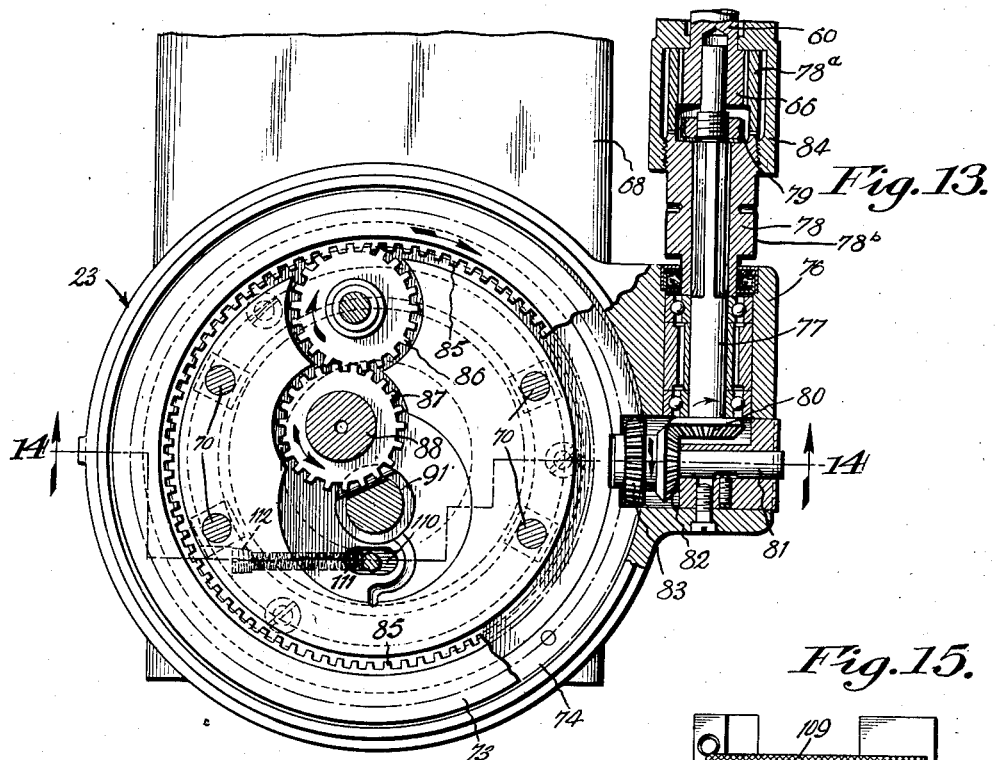
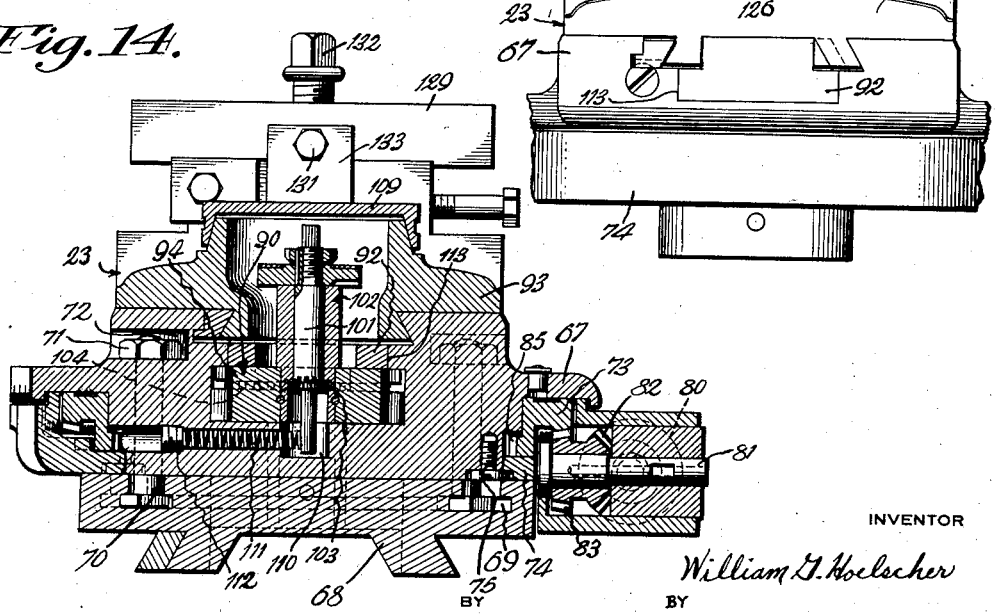
INVENTOR
William G. Hoelscher
BY
Wood+Wood ATTORNEYS Aug. 13, 1935.　　　　W. G. HOELSCHER　　　　2,011,318
RELIEVING ATTACHMENT
Filed July 2, 1934　　　7 Sheets-Sheet 7

INVENTOR
William G. Hoelscher
BY
Wood + Wood
ATTORNEYS

Patented Aug. 13, 1935

2,011,318

UNITED STATES PATENT OFFICE 2,011,318

RELIEVING ATTACHMENT

William G. Hoelscher, Norwood, Ohio, assignor to The American Tool Works Company, Cincinnati, Ohio, a corporation of Ohio Application July 2, 1934, Serial No. 733,369

14 Claims. (Cl. 82—19)

This invention relates to machine tools and is particularly directed to an improved relieving attachment or a mechanism of the character adapted to move a tool into and out of the work in a cycle adustably related to the movement of the work relative to the tool. The purpose of the attachment is to "back off" or relieve, especially contoured work such as hobs, taps, cutters, dies, etc. As exemplary of the type of mechanism concerned in the present instance, reference is made to the patent to Sosa No. 1,081,470, December 16, 1913, the present invention being in the nature of an improvement on the construction shown in the aforesaid patent.

It is the object of this invention to provide an improved mechanism of this character for relieving purposes in the nature of an attachment which has the following advantages: is quickly mounted and dismounted relative to the conventional cross slide of a lathe and for this purpose incorporates a readily uncoupled drive connection extended to the headstock spindle driving gearing of the lathe; includes a selective connection which may be quickly shifted for converting the tool carrying slide movement for internal or external relief work, that is to say, is convertible for accomplishing, either a relatively slow feeding movement of the tool toward and into the revolving work, and a rapid withdrawal movement at a definite time, or a rapid tool movement toward the work at a definite time and a slow withdrawal, in other words, reversal of the cycle of tool operation; includes adjustment means in the device for accurately timing the movement of the tool relative to the movement of the work; includes compact adjustment means in the operating unit for varying the length of the stroke; prevents damage to the parts, in the event that the drive from the headstock is reversed, by the provision of an automatically uncoupled means or one way clutch in the drive; and finally which permits adjustment of the stroke of the tool for exceedingly short strokes with absolute accuracy.

It is a fundamental object of the invention to provide an attachment of this nature which is a unitary compact construction quickly detachable from the conventional cross slide and completely self-contained as to all its mechanism, that is, incorporates all of the moving parts within the turret or main revolving body of the device as opposed to distribution of the working parts on the cross slide and turret, and which when in position of use permits the normal movements of the cross slide and carriage because of an especially constructed drive connection thereto.

Other objects and further advantages will be more fully apparent from a description of the accompanying drawings, in which.

Figure 1:
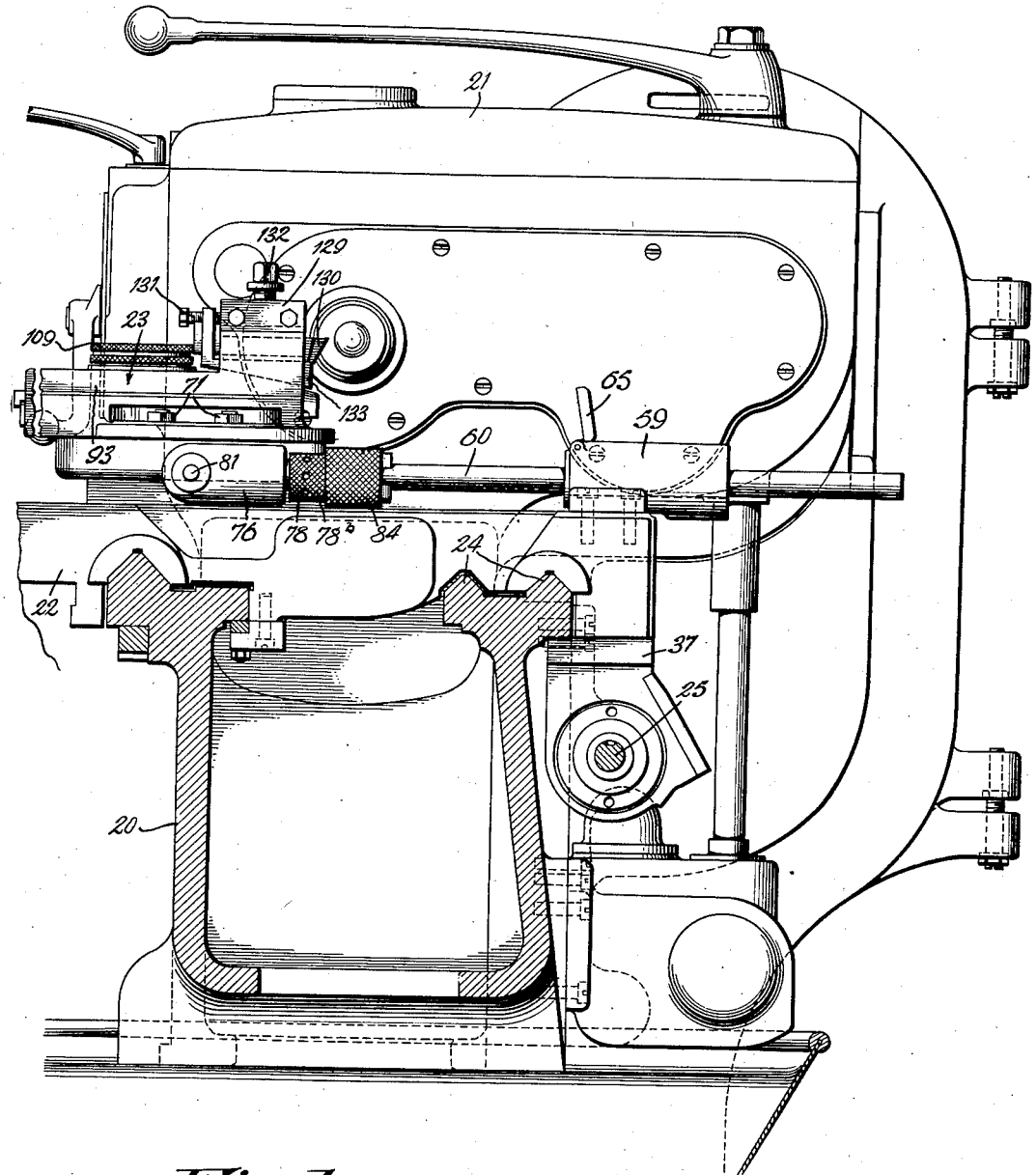
Figure 1 is a cross sectional view taken transversely of the lathe looking toward the headstock end thereof and generally illustrating the improved relieving attachment.
Figure 2:
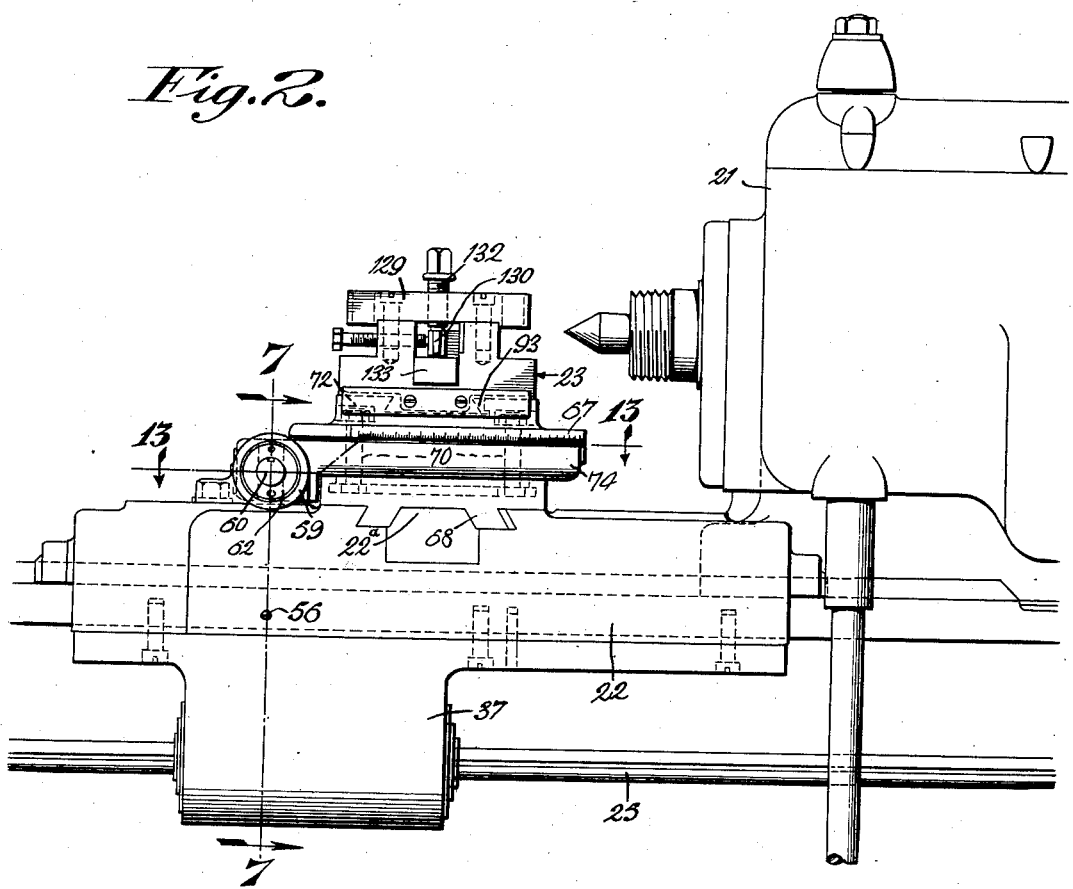
Figure 2 is a fragmentary side view illustrating the relieving attachment in relation to the headstock of the lathe.
Figure 3:
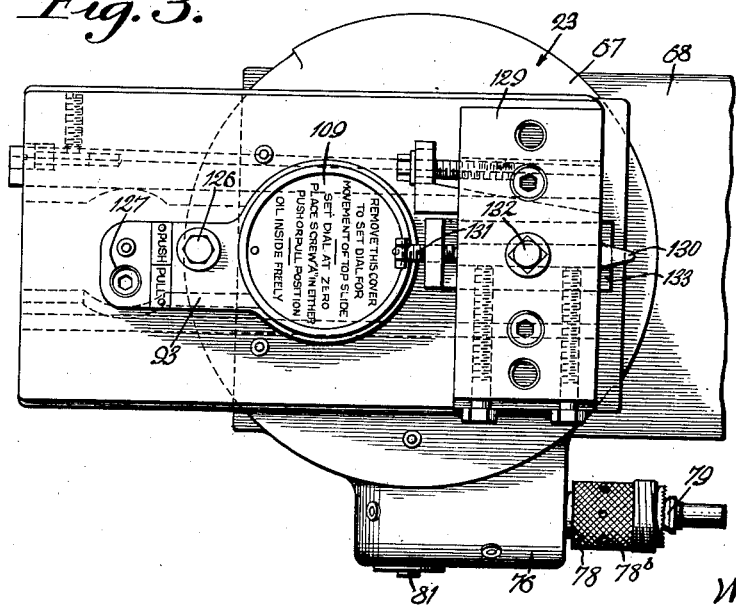
Figure 3 is a top plan view of the relieving attachment.
Figure 4:
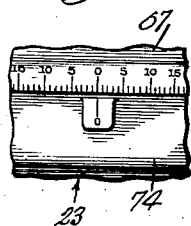
Figure 10:
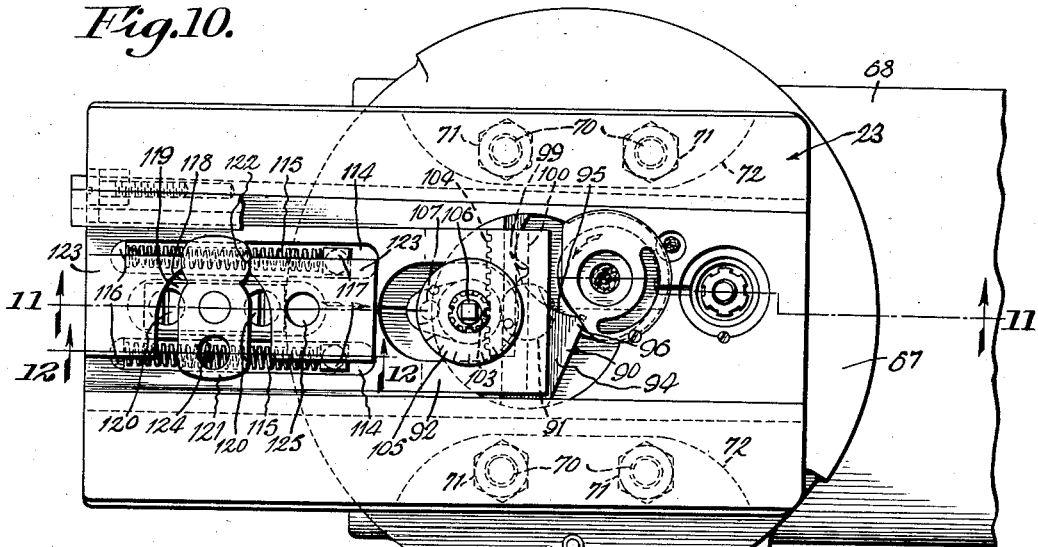
Figure 12:
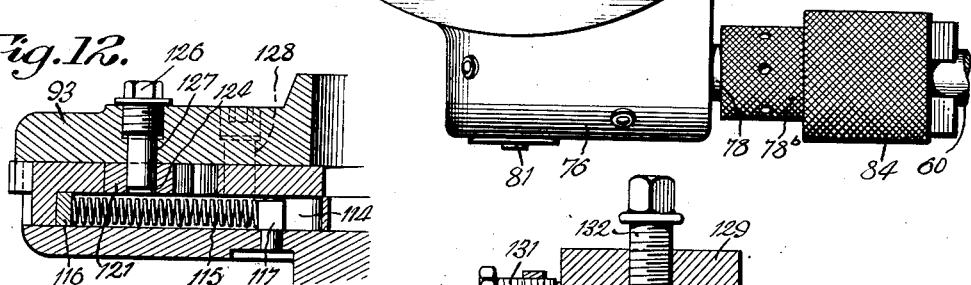
Figure 11:
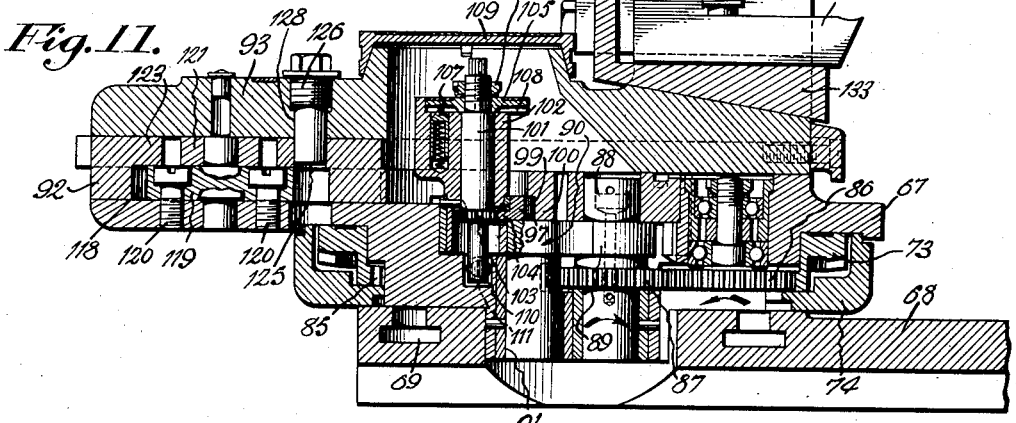
Figure 16:
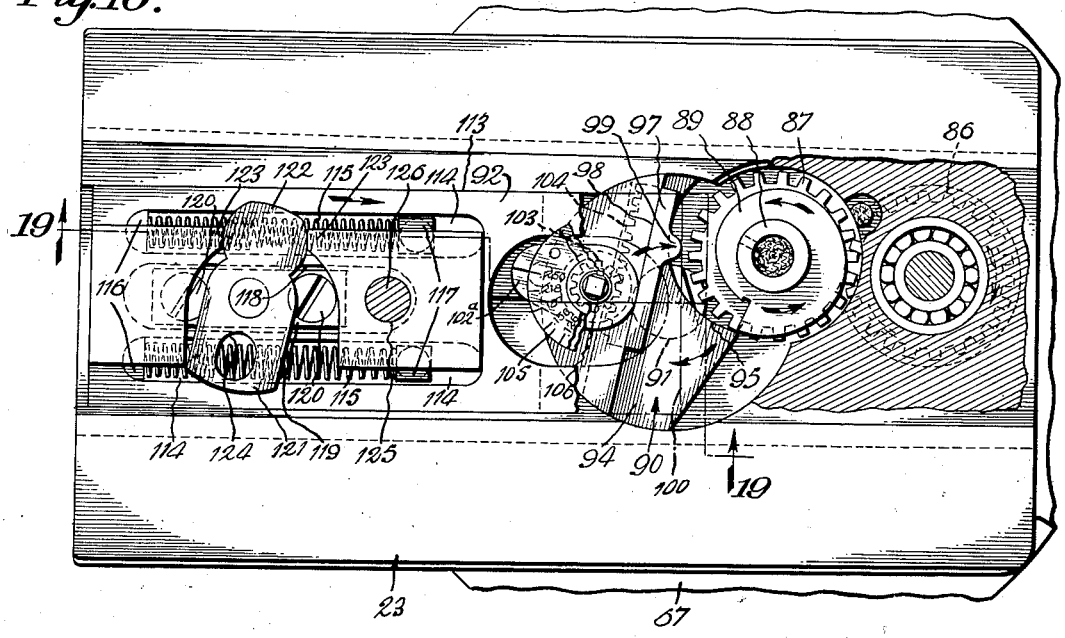
Figure 17:
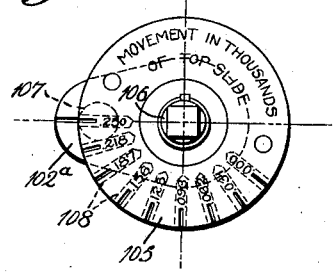
Figure 18:
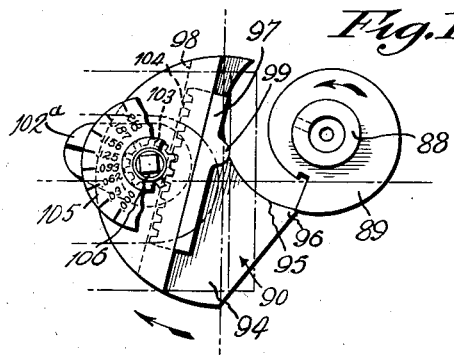
Figure 19:
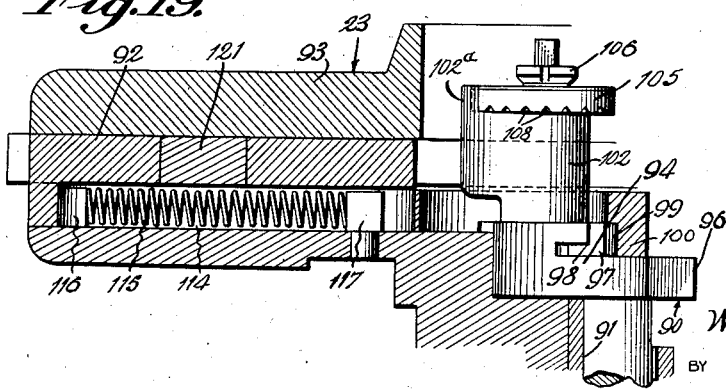

Figure 4 is a fragmentary side view showing the rotative adjustment gauge for the attachment for determining the angle at which the tool approaches the work, Figure 5 is a fragmentary end view of the lathe, illustrating the gearing for driving the back shaft which drives the relieving attachment, Figure 6 is a sectional view taken on line 6—6, Figure 5, detailing the transmission extension from the headstock, Figure 7 is a sectional view taken on line 7—7, Figure 2, detailing the drive extended from the back shaft to the attachment, Figure 8 is a sectional view taken on line 8—8, Figure 7, further detailing the drive connection, Figure 9 is a sectional view taken on line 9—9, Figure 8, detailing the one-way clutch in the drive from the back shaft to the attachment and including a side view thereof, Figure 10 is a top plan view of the relieving attachment with the top or tool slide removed, showing the attachment at the beginning of its stroke, Figure 11 is a sectional view taken on line 11—11, Figure 10, illustrating the attachment in detail, and showing the push connection established, Figure 12 is a sectional view taken on line 12—12, Figure 10, illustrating the pull connection established, Figure 13 is a sectional view taken on line 13—13, Figure 2, illustrating the general drive connection to the attachment, Figure 14 is a sectional view taken on line 14—14, Figure 13, showing further details of the attachment, Figure 15 is an end view of the attachment, Figure 16 is a fragmentary top plan view of the attachment with the top slide removed and parts broken away and showing the attachment operating for its full throw, Figure 17 is an enlarged detail view of the adjusting means for the movement of the tool carrier slide, Figure 18 is a detail view illustrating the slide actuating means in operation for a short throw; and Figure 19 is a sectional view taken on line 19—19, Figure 16, further illustrating the slide operating mechanism.

The present invention is in the form of a compact unit which can be readily mounted and dismounted. It is shown in this instance mounted on the carriage of a lathe. A drive connection is provided to the headstock spindle drive gearing which is quickly coupled or uncoupled. Accordingly, as provided through a common power source with the spindle, the tool can be reciprocated in synchronism with the rotation of the spindle in any desired ratio.

Referring to the drawings, the bed of the lathe is indicated at 20, the headstock at 21, the carriage at 22, the cross slide at 22ª, and the improved relieving attachment generally at 23. The bed is provided with the usual rails or ways 24 upon which the carriage is translatively mounted. Details of the headstock and bed are not of importance in the present case, and therefore are not described.

The relieving attachment is driven by means of a shaft 25 extended longitudinally of the lathe at the rear of the bed thereof.

Referring to Figures 5 and 6, it will be observed that the drive for this shaft is taken from the outer end of the headstock through a train of gears. These gears taken in their order in the train are indicated at 26, 27, 28, 29, 30, 31, 32, 33, 34 and 35. The purpose of the train of gears, apart from the fact that it carries the drive from within the headstock and affords interchangement of gears for varying the timing of the reciprocations of the tool relative to the rotation of the spindle, is not explained herewith for the reason that this invention is primarily concerned with the relieving attachment.

The shaft 25 is journalled in a roller bearing bracket 36 at the outer end of the headstock, and in another bracket (not shown) at the tailstock end of the machine not shown. The transmission casing 37 detailed in Figures 7 and 8 is secured to the underside of the carriage at the rear thereof by means of screws and depends in position where it is traversed by the shaft 25.

Referring to the details of Figures 7 and 8, the transmission casing 37 mounts a sleeve 38 in roller bearings 39, 39, in the respective end walls of the casing. The shaft 25 loosely traverses this sleeve and is in splined connection therewith by means of a key 40 fixed in the sleeve and engaged in a longitudinal slot 41 in the shaft. Therefore, the carriage can be moved longitudinally without disturbing the driving connection to the relieving attachment inasmuch as it can slide freely relative to the shaft. Suitable dust covers 42 are secured in the end walls of the transmission casing for covering the bearings.

A clutch 43 is inserted in the drive from the sleeve 38 and permits a positive drive in one direction but is inoperative for drive in the reverse direction. As a part of this one-way clutch a collar 44 is splined on the sleeve 38. For this purpose the key 43 extends radially outwardly beyond the sleeve element and is engaged in a longitudinal axial slot 45 in the internal bore of the clutch driving collar. The driving clutch collar 44 engages a driven clutch collar 46 loosely journalled on the sleeve 38 by means of teeth respectively on the adjacent end faces of the clutch collars.

The clutch collars 44, 46, are spaced by means of a spacer sleeve 47. A coil spring 48 under compression between a thrust washer 49, lying against an end bearing 39, and a shoulder of the driving clutch collar normally urges the driving clutch collar into engagement with the driven clutch collar. The teeth of the clutch elements are shown in Figure 9. In the instance of the element 44, a single square ended tooth 44ª is provided whereas the other element 46 includes a single abrupt shoulder 46ª at the end of a receding surface 46ᵇ. It will be seen that this clutch will drive positively in only one direction. Accordingly, if the spindle drive is reversed the drive to the attachment is uncoupled. As will be apparent as the description progresses, the cam operating the tool slide of the attachment can only operate in one direction because of an abrupt drop off in its contour. Accordingly, the reversal of drive to the cam is prevented by breaking the drive at the one-way clutch automatically when the drive is reversed to the spindle.

The driven clutch collar includes a bevel gear at its outer end meshing with a bevel gear 50 fixed on the lower end of the vertical drive connecting shaft 51. This vertical shaft is extended through to the top of the carriage and is journalled in upper and lower bearings 52, 52. A bevel gear 53 is fixed on the upper end of the shaft. The gears, top and bottom respectively, are engaged against the particular bearings, and spacer sleeves 54, 55, appropriately space the inner and outer races of the bearings. A dog point screw 56 engaged through the side of the carriage registers with a depression in the outer spacer sleeve 55, thereby maintaining the vertical shaft assembly in position.

The upper bevel gear 53 is in mesh with a bevel gear 57 journalled in a bearing sleeve 58 in a gear box 59 fixed on the top of the carriage. The axis of this gear box lies in a horizontal plane, parallel with the cross slide 22ª or crosswise of the ways of the bed. A horizontal drive connecting shaft 60 passes through the gear box and is in splined connection through the bevel gear 57 by means of a key 61. A plug 62 is screwed into the outer end of the bracket 59 against the outer end of the bevelled gear 57 for maintaining it in position.

The shaft 60 is journalled at the inner end of the top bracket by means of a fixed bearing sleeve 63, also in splined connection with the shaft by means of a key 64. A hinged cap 65 is fixed at the inner end of the top bracket and is adapted to be swung down for covering the shaft opening when the shaft is withdrawn as when the relieving attachment is not in use. The horizontally disposed shaft 60 has a splined portion 66 formed integrally therewith at its inner end, this gear being part of a quick coupling for detachable connection to the relieving attachment itself.

It will be noted that the drive connection to the relieving attachment as brought to the cross slide 22ª of the carriage 22 permits free movement of the carriage and cross slide because of the splined connection of shaft 25 through gear box 37 and shaft 60 through gear box 59.

The turret 67 of the relieving attachment is rotatably fixed to the cross slide 68 of the carriage. A circular T-groove 69 is provided in the top surface of the cross slide. A series of T-bolts 70 are disposed in the body of the relieving attachment on the radius of this groove for the purpose of securing the attachment. These bolts carry nuts 71 at their upper ends located in recesses 72 in the side of the body. Through this attachment means at the turret 67 the relieving attachment may be circularly adjusted and fixed in angular position as determined by the line of direction in which it is desired to reciprocate the tool in its relieving operations.

A compound ring gear 73 is journalled for rotation on the axis of the turret against the underside of the turret 67 in an undercut portion thereof. A gear support bracket 74 of circular structure is supported on the underside of the turret by means of screws 75. The screw heads engage under the bracket for rotatively adjustably supporting the bracket.

The drive for the ring gear is taken from the splined end 66 of the horizontal shaft 60. For this purpose the bracket 74 includes a laterally disposed lug 76. A short shaft section 77 is journalled in this lug on the axis of the horizontal shaft, which axis is parallel to a tangent of the ring gear. This shaft section telescopes in the end of shaft 60 and carries a sleeve 78 fixed on its outer end, having minute clutch teeth on its outer end. The shaft 77 is journalled in spaced ball bearings on the bracket and is held against longitudinal displacement by a nut 79 on its outer end securing the sleeve 78 and an integral inner bevel gear 80 of the shaft against the spaced bearings.

A sleeve element 78a having minute clutch teeth on its end cooperating with the minute clutch teeth on the sleeve fixed to the stub shaft is in splined connection with the splined end of the horizontal shaft 60. A coupling sleeve 84 is mounted on the shaft 60 and has an internal abutment with the shoulder at the inner end of the splined portion of the shaft and with the outer end of the connecting sleeve 78a. Screw threads are provided on the outer surface of the sleeve 78 and on the adjacent inner surface of the coupling sleeve 84. The coupling sleeve 84 is externally knurled and is therefore readily screwed onto the fixed sleeve 78 for drawing the connecting sleeve 78a into toothed engagement with the sleeve 78.

The fixed sleeve 78 includes an exposed peripheral portion 78b which is knurled for manipulation and provided with sockets for a spanner wrench. When the operator desires to minutely adjust the timing of the relieving tool movement relative to the movement of the work, he unscrews the coupling sleeve 84 thereby disengaging the sleeves 78 and 78a. It is then possible to rotate the driving parts within the relieving attachment for setting the tool relative to the work. Because of the fineness of the clutch teeth used, recoupling does not materially vary the setting of the tool relative to the transmission from the spindle drive.

Another stub shaft 81 is journalled in the bracket lug radially of the bracket, and has a bevel gear 82 meshing with the bevel gear 80 and a bevel gear 83 meshing with bevel teeth on the compound ring gear 73.

Internal teeth 85 of the compound ring gear 73 mesh with the teeth of a spur gear 86 meshing with an inner spur gear 87, the spur gears being journalled in the turret. The latter gear 87 is fixed on a wiper cam shaft 88, which shaft is journalled in upper and lower bearings for increased steadiness. The wiper cam 89 is disposed just above the gear 87 between the journals of the shaft and operatively engages an oscillating rocker unit 90 rotatively contained on a fixed axis in a bore 91 of the turret. This unit is the driving connection to the plunger 92 which actuates the top or tool carrying slide 93 of the attachment.

The rocker unit contains throw adjustment means for varying the length of the reciprocating stroke of the tool slide. The cam contacted or main body element 94 of the unit includes a curved contact surface 95 terminating in an abrupt shoulder 96. The cam 89 is of the abrupt shoulder type whereby the rotation of the cam as shown in Figures 16 and 18 causes a sudden release of the plunger 92 and the plunger will be quickly retracted by spring action. The transmission of the plunger movement, which is gradual as the cam slowly rotates the rocker unit and abrupt as it releases, to the tool slide can be reversed as will be hereinafter described for internal and external work contouring operations.

The oscillating body 94 of the rocker unit carries an adjustable plunger contact element 97 slidably mounted on a cross surface 98 of the body 94. A rounded contact lug 99 is provided on this element and is in engagement with a depending cross flange 100 on the extreme inner end of the plunger. This lug 99 is adjusted diametrically of the body 94 and relative to the axis thereof for varying plunger movement.

The adjustment of the element 97 for setting its contact lug is made by means of a shaft 101 journalled in a sleeve 102 vertically fixed in the body element 94 of the unit. A gear 103 fixed on the lower end of the shaft 101 meshes with rack teeth 104 on the element 97. A graduated dial 105 is fixed on the upper end of the shaft by means of a nut 106 and moves relative to a fixed point on a lug 102a of the sleeve 102. The upper end of the shaft is squared for rotation thereof. A detent 107 in the sleeve beneath the dial determines the various positions of the dial by engagement with grooves 108 thereof. A cap 109 closes the space in the tool slide and plunger, housing this unit, and carries the instructions for adjustment.

The shaft 101 is extended downwardly into a slot 110 in the turret. This slot is of sufficient width to permit the arcuate movement of the shaft 101. A spring 111 is disposed in a bore extended from the end of the slot and is under compression between a plug 112 at the end of the opening and the shaft extension. This spring maintains the contact of the rocker unit against the wiper cam at all times and is quite advantageous for using full action when the extremely short plunger strokes are used. When the finer stroke adjustments are used, the springs of the plunger are practically ineffective for maintaining the contact of the rocker arm with the cam because of the short leverage afforded between the axis of the rocker unit and the contact 99 for swinging the rocker unit.

The plunger 92 is slidably journalled in a slot 113 of the turret. Spaced longitudinal slots 114 are provided in the plunger housing springs 115 under compression between pads 116 at the outer ends of the slots and abutments 117 secured in the turret. These springs urge the slide outwardly at all times and maintain positive contact between the flange 100 and the contact lug 99 of the rocker unit for imparting a rapid movement to the plunger upon release by the cam. This plunger also includes a longitudinal slot 118 in its outer end clearing a pivot lug 119 fixed to the turret by screws 120. A pivot stud extends upwardly from the lug and a motion converting lever 121 is centrally pivoted thereon. The lever 121 has a rounded end 122 rotatable between curved contact surfaces of lugs 123 of the plunger. An aperture 124 is provided in the outer end of the lever and another aperture 125 in the inner lug 123 of the plunger. A connector screw 126 is mounted in the tool slide and is selectively engaged in one of the apertures 127, 128, adjacent and vertically aligned with the respective apertures 124, 125. If the connector screw is screwed in aperture 127 and engaging in aperture 124 of the lever, the result is a slow pull or feed of the tool away from the spindle axis for internal relief work and a quick return. If placed in apertures 128 and 125, the converse is true for external relief work.

A tool post 129 is provided on the tool slide and a tool 130 is fixed therein by means of set screws 131, 132 and gibs 133.

The relieving attachment herein described is a completely self-contained unit and is quickly attached to the conventional slide in place of the conventional tool post and holder. As has been described, the drive is brought to the carriage from the headstock end of the lathe and is carried upwardly through the rear end of the carriage to the gear box 59.

The drive shaft 60 which is slidably mounted through this gear box and in splined connection with the gearing thereof, is connected to the relieving attachment by means of the coupling sleeve 84. It will be apparent that the drive shaft can be quickly engaged through the gear box when desired and constitutes a separately detachable driving element.

The relieving attachment unit is attached to the slide by the bolts cooperating with the circular T-shaped slot in the slide, this arrangement permitting rotative adjustment of the relieving attachment.

It will be noted that the edge of the turret is graduated (see Figures 2 and 4), the graduated edge moving relative to a zero mark on a lug of the stationary gear support bracket 74, whereby the tool may be accurately angularly adjusted. The rocker unit, as has been described, incorporates a structure for adjusting the throw of the relieving tool carrying slide. This adjustment is accomplished by varying the position of the contact point of the rocker unit in relation to the axis of the rocker unit. The cam operating the rocker unit has a definite throw and is contoured to provide a relatively slow rotation of the rocker unit and translation of the slide and a sudden release through a drop-off or sharp abutment on the cam, at which time the springs of the relieving attachment are effective for a relatively quick reverse translation of the slide and rotation of the rocker unit.

The rocker unit includes spring means urging it into contact with the cam at all times so that there will be no lost motion in slide movement because of failure of contact between the rocker unit and the cam, particularly in the extremely short strokes of the slide. The slide is held in constant contact with the contact point of the rocker unit by its springs.

Now the cam and rocker unit impart a constant cycle of movement to the slide. This cycle can be reversed for converting the apparatus from use on internal relief work to external relief work or vice-versa.

The device for accomplishing this change is in the form of the connector screw 126, mounted in the slide and engageable either with the end of the lever 121 or with the lug 123 of the plunger. It will be apparent that as movement is imparted to the plunger in one direction, this same direction of movement can be maintained to the slide by connection directly thereto with the lug 123. On the other hand, if it is desirable to reverse the movement of the slide as opposed to the movement of the plunger, attachment to the swinging end of the lever 121 will be effective for this purpose.

Through the provision of the one-way clutch in the drive to the relieving attachment, it is impossible to damage the parts by reverse rotation from the headstock. It is obvious that reverse rotation as imparted to the rocker arm actuating cam would completely damage these parts because of abutment of the shoulder of the cam with the periphery of the rocker unit.

Having described my invention, I claim:

1. A relieving attachment, comprising, a turret, means for rotatively mounting said turret, a relieving tool carrying slide slidably mounted on said turret, a rocker unit including a swinging contact for actuating said slide, means for adjusting said contact relative to the axis of rotation of the rocker unit, a cam for actuating said rocker unit, and means for rotating said cam.

2. A relieving attachment, comprising, a turret, a support rotatably supporting said turret, a tool carrying slide on said turret, a continuously rotating cam journalled in said turret, a transmission for driving said cam, a rocker unit operated by said cam having a swinging engagement with said slide, said slide incorporating superimposed slide elements, a pivotally mounted lever between said elements having one end operated by the driven one of said elements of the slide, and connection means for alternately connecting the slide elements directly or connecting the other end of the lever to the tool carrying element of the slide.

3. A relieving attachment, comprising, a turret, means for mounting said turret, a relieving tool carrying slide slidably mounted on said turret, a rocker unit including a swinging contact for actuating said slide, a cam for rotating said rocker unit, said cam having an abrupt shoulder on its contour, said rocker unit having a curved surface contacted by said cam, said surface terminating in an abrupt relief surface disposed substantially radially of the cam when the cam shoulder abuts said relief surface, means for rotating said cam, and a one-way clutch in said cam rotating means.

4. A relieving attachment, comprising, a turret, a support rotatably mounting said turret, a tool carrying slide on said turret, a uni-directional slide actuating device, a transmission for driving said device, said slide incorporating superimposed slide elements, a pivotally mounted lever between said elements having one end operated by the driven one of said elements of the slide, and connection means for alternately connecting the slide elements directly or connecting the other end of the lever to the tool carrying element of the slide.

5. A relieving attachment, comprising, a swivel block, means for rotatively adjustably mounting said swivel block, a relieving tool carrying slide mounted on said swivel block, a device in said swivel block for actuating said slide, a transmission for said device, and a coupling at said swivel block for connecting said transmission to said device, whereby said device may be hand operated for changing its relation to the transmission for setting the tool relative to the work.

6. A relieving attachment, comprising, a turret, a relieving tool carrying slide on said turret, a fixed transmission support mounted concentrically of said turret, a transmission extended through said support including a ring gear mounted concentrically of said turret, a spur gear mounted on said turret and driven from said ring gear, a cam rotatively fixed to the spur gear, and a rocker unit operated by said cam and engaging said slide for actuating the slide.

7. In a lathe including a carriage and cross slide on the carriage; a relieving attachment mounted on the cross slide of the carriage including a tool slide, a tool slide operating transmission completely contained within the relieving attachment, and a drive shaft adapted to be coupled to said relieving attachment for operating said transmission.

8. In a lathe including the carriage and cross slide thereof; a relieving attachment mounted on the cross slide of the carriage, a gear box mounted on the carriage, a transmission extended to said gear box, a relieving attachment drive shaft having a splined driving connection through said gear box lengthwise of the cross slide, and a coupling for quickly connecting the shaft to the relieving attachment.

9. In a lathe including the carriage and cross slide thereof; a relieving attachment mounted on said cross slide, a gear box depending from said carriage, a horizontal drive shaft having a splined driving connection through said gear box parallel to the movement of said carriage, a gear box on the top of said carriage, a connecting shaft between said gear boxes, a horizontal shaft disposed parallel to the movement of the carriage cross slide and having a splined driving connection through said upper gear box, and coupling means detachably connecting said latter shaft to the relieving attachment.

10. A relieving attachment, comprising, a swivel block, a fixed transmission support mounted axially of said swivel block and rotatably adjustably supporting the swivel block, means for mounting said swivel block and support as a unit, a transmission in said support, a tool slide on said swivel block, and a slide operating device in said swivel block driven by said transmission.

11. A relieving attachment, comprising, a turret, means for mounting said turret, a relieving tool carrying slide mounted on said turret, a rocker unit including a contact operatively engaging said slide, springs urging said slide against said rocker unit, a cam engaging said rocker unit, means for rotating said cam, and a spring operatively engaging said rocker unit for maintaining the contact of the rocker unit with the cam.

12. A relieving attachment, comprising, a swivel block, a tool carrying slide on said block, unidirectional means for actuating said slide for tool feed, a slide translating element including a device for reversing the direction of movement of said slide as moved by said uni-directional actuating means.

13. A relieving attachment, comprising, a swivel block, a support for said swivel block, a tool slide on said swivel block, a rocker unit mounted in said swivel block, a cam for actuating said rocker unit, and said rocker unit including a diametrically adjustable contact bar having a contact engaging said slide and an adjustment means for translating said bar for changing the position of the contact relative to the axis of the rocker unit.

14. A relieving attachment, comprising, a block, a tool carrying slide on said block, a uni-directional cam for moving said slide in one direction, spring means for moving said slide in the other direction, and a device interposed between the cam and slide for reversing those movements of the slide imparted by the cam.

WILLIAM G. HOELSCHER.